(12) United States Patent
Dimov et al.

(10) Patent No.: US 11,995,102 B2
(45) Date of Patent: May 28, 2024

(54) BIDIRECTIONAL DATA REPLICATION WITH WAIT FOR DATA FUNCTION

(71) Applicant: INTERNATIONAL BUSINESS MACHINES CORPORATION, Armonk, NY (US)

(72) Inventors: Vassil Radkov Dimov, Stuttgart (DE); Eirini Kalogeiton, Stuttgart (DE); Jens Müller, Stuttgart (DE); Felix Beier, Haigerloch (DE); Christian Wilhelm Paul Hoerst, Boeblingen (DE); Johannes Severin Kern, Boeblingen (DE); Daniel Martin, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 17/657,155

(22) Filed: Mar. 30, 2022

(65) Prior Publication Data
US 2023/0315753 A1 Oct. 5, 2023

(51) Int. Cl.
*G06F 16/00* (2019.01)
*G06F 16/182* (2019.01)
*G06F 16/23* (2019.01)
*G06F 16/27* (2019.01)

(52) U.S. Cl.
CPC ........ *G06F 16/273* (2019.01); *G06F 16/1824* (2019.01); *G06F 16/2365* (2019.01)

(58) Field of Classification Search
CPC . G06F 16/273; G06F 16/1824; G06F 16/2365

USPC ........................................... 707/613
See application file for complete search history.

(56) References Cited

U.S. PATENT DOCUMENTS

| 10,394,798 B1* | 8/2019 | Holenstein .......... G06F 16/2365 |
| 2020/0012659 A1 | 1/2020 | Dageville |
| 2020/0117680 A1* | 4/2020 | Bapat ...................... G06F 9/546 |
| 2020/0320059 A1* | 10/2020 | Kumar .................... G06F 16/27 |
| 2021/0319115 A1* | 10/2021 | Kassouf .............. H04L 63/0428 |

OTHER PUBLICATIONS

"Method for Replicating DDL Statements in Database-Accelerator Environments", An IP.com Prior Art Database Technical Disclosure, IP.com No. IPCOM000265569D, IP.com Electronic Publication Date Apr. 27, 2021, 3 pages, <https://priorart.ip.com/IPCOM/000265569>.
Mell et al., "The NIST Definition of Cloud Computing", National Institute of Standards and Technology, Special Publication 800-145, Sep. 2011, 7 pages.

* cited by examiner

*Primary Examiner* — Chelcie L Daye
(74) *Attorney, Agent, or Firm* — Edward J. Wixted, III (57) ABSTRACT

In an approach, a processor receives a data manipulation request on a target database. A processor sends the data manipulation request to a source database. The source database attempts to persist a data manipulation action relating to the data manipulation request. Responsive to a successful attempt to persist the data manipulation action: the source database sends a log position of the data manipulation action to a data replication engine; a processor replicates the data manipulation request triggering the data manipulation action in the target database; and a processor confirms to the target database that the data manipulation action in the target database has been completed.

17 Claims, 7 Drawing Sheets

BIDIRECTIONAL DATA REPLICATION WITH WAIT FOR DATA FUNCTION

BACKGROUND

The present invention relates to data replication, and more specifically, to an approach for data replication in a database management system comprising a source database and a target database.

Proper data management remains one of the hot topics in IT (information technology) departments. Although there is a trend towards storing more and more data on cloud computing systems, customers with sensitive data, especially in regulated industries, are following the hybrid cloud approach with the consequence that more and more data are replicated to a cloud storage system. Additionally, the requirement for data analytics—although being a mainstream technology for many years—is becoming more sophisticated and more widely used across departments and as part of the business processes. Hence, it has become common in practice to distinguish data management between online transaction processing (OLTP) data and online analytical processing (OLAP) data. In hybrid storage environments, often read-only data may only be stored in cloud computing storage system. So, it is not unusual to manage transactional data on-premise and a replicated related analytical version of the data on a cloud storage system. This may make it comparably easy to access the data from everywhere via the Internet and from different locations.

However, in currently implemented systems, the user is typically only allowed to perform data manipulation-actions on the source database when data are replicated by a data replication engine to a target database. This restriction takes place because the replicated target databases are read-only, which means that the user can execute analytical queries and/or read-only queries that are based on replicated tables from the source database.

In another use case—e.g. mobile banking—the target database can be used to reduce the workload/utilization of the source database. The number of transactional queries is often unpredictable causing huge workload on a source database. Hence, applications (i.e., customers) may use an additional target database (in this use case usually consisting of replicated data from the source database) to reduce the workload on the source database and balance it to the target database.

Nowadays, users want to leverage the target database (that may often exist in the cloud) for more than read-only activities. This approach would allow users to perform the analytical queries directly on the replicated, i.e., target database, without executing any data manipulations actions to the source database. It may also be taken into account that in the current available architecture, there are some restrictions that affect application programmers/users. Application users sometimes want to use the target database to perform data manipulation actions, instead of only executing queries. If one would follow the requirements of the users (or programmers), one would allow data manipulation actions to the target database as well. However, these modifications on the target database must be consistent with the source database entities to the known ACID properties (atomic, consistency, isolation, durability) of the database system.

One possible solution to such a requirement of performing modifications in the target database is to apply a two-phase commit protocol involving the source database to ensure consistency in the database system. However, such an approach may lead to frequent failures and block situations of the entire database system because of concurrent changes happening to records in the source database. Even if this were not be the case, many concurrent changes that could take place on both, the source and the target database side could result in a high number of locking messages and rollbacks in the target database if the source database does not allow commit actions.

SUMMARY

Aspects of an embodiment of the present invention disclose a computer-implemented method, a computer program product, and a computer system. A processor receives a data manipulation request on a target database. A processor sends the data manipulation request to a source database. The source database attempts to persist a data manipulation action relating to the data manipulation request. Responsive to a successful attempt to persist the data manipulation action: the source database sends a log position of the data manipulation action to a data replication engine; a processor replicates the data manipulation request triggering the data manipulation action in the target database; and a processor confirms to the target database that the data manipulation action in the target database has been completed.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject matter, also any combination between features relating to different subject matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings.

DETAILED DESCRIPTION

Embodiments of the present invention recognize that there is a need to increase the capabilities of source/target database combinations to perform data manipulation operations on the target database side without losing value to the users in terms of consistency, throughput, latency and rollbacks and deadlocks.

In the context of this description, the following conventions, terms and/or expressions may be used:

The term "database management system" may denote software that may interact with an end-user, applications, and the database itself to capture and analyze the stored data. Typically, database management systems software may additionally comprise core facilities in order to manage and administer the data in the storage of the database. The complete construct of the database itself, the database management system (DBMS) and potentially associated applications may be referred to as database system. The database itself can be seen as an organized collection of data stored and accessed electronically.

The term "source database"—or "primary database"—may denote here a first portion of the database system, typically used as primary access point for transactional data, hence, a database being optimized for, e.g., fast transactions or online transaction processing. However, databases optimized in such a way—e.g., for fast read, write, and/or update operations on the data—may be slow in performing complex queries involving a high number of tables or a large amount of data, such as in the case of online analytical processing. Additionally, the online analytical processing may slow down the online transaction processing. Therefore, highly optimized database management systems of the above mentioned types of databases may successfully work as a tandem. The source database may be a relational database with database table storing data in records.

The term "target database" or "secondary database" may denote the second database in such a tandem of databases being optimized for different tasks. In the context of the here described concept, the target database may be optimized for data analysis, e.g., online analytical processing. The target database may store at least portions of the tables and portions of the data in the tables of the source database. The target database may also be comprised of two portions: an in-memory portion for a fast execution of complex and multi-dimensional queries, and a persistent portion which may store the tables and data of the in-memory portion of the target database on the longer-term storage, e.g., a hard disk or a flash memory. This way, the target database may be enabled to—in case of a crash of the target database—recover most of its content from the persistent storage. In some contexts, the target database may also be denoted as accelerator or accelerated database. Also the target database may be a relational database with database table storing data in records; and for access optimization reasons the organization of the data may be column-wise.

The term "linked databases" may denote at least two databases that are closely related to one another. In the context of this document linked databases may be denoted as those that may store, at least in part, identical data. On the other hand, the primary database—e.g., the source database may be optimized for other tasks than the secondary database, e.g., the target database. In other words, the target database may be synchronized with parts of the source database.

The term "data manipulation request" may denote a request to a database system, e.g., the source database or the target database to change data stored in the DBMS. This may be achieved by insert, update, or delete instructions or operations to existing stored data, i.e., a data manipulation action. A read request should not be denoted as data manipulation request because during a read operation the stored data is not altered.

The term "replication engine" may denote a mechanism for a system to copy or move data from a source storage—e.g., the source database—to a target storage, e.g., the target database, in a reliable and secure way. The replication may be only performed on demand or as a permanent and continuous background process. Predefined rules may be used to define and optimize the replication process controlled by the replication engine. One way to achieve an initial replication from the source database to the target database may be a bulk load process. Alternatively, and often used as a continuous process, the recovery log data of the source database may be used to replicate defined transactions—or better: results of transactions—to the target database.

The term "persist" may denote here to making a change to the data in a database permanent, e.g., after a transaction is committed. A persisted data manipulation action should no longer be easily reversible, e.g., not by a standard rollback operation. Rollback operations work best before a commit operation.

The term "unsuccessful attempt to persist the data manipulation action" may denote that it was not possible to execute the commit operation for a change to data in a database because, e.g., the data has been locked by another transaction or because the commit operation was not possible because of other reasons.

The term "log position" may denote a sequence number of results of already performed transactions in a database, e.g. the source database. Each position of the log record may store an IUD (insert, update, delete) request to a database. Hence, using the log file storing all log records, a database may be reconstructed.

The term "in-memory database" may denote the part of the linked databases, e.g., the target database, which may hold almost all of its data in the main memory of the computer system. Hence, the database management system of the target database may comprise an in-memory portion and, optionally, also a persistent portion of the target database, wherein the persistent portion may be—apart from the last changes to the in-memory—a persistently stored copy of the in-memory portion.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The proposed approach for data replication in a database management system comprising a source database and a target database may offer multiple advantages, technical effects, contributions and/or improvements:

A typical scenario of using source and target databases may be optimized from the perspective of a user. Suppose, a source database may be implemented as a transactional database supporting business or technical applications (e.g., an order entry system or measured seismic data of an oil drilling company) at a corporate headquarters. The same company may operate a series of copies or replicated databases or a target database using cloud computing cloud storage technologies. These replicated databases may exist in different locations and/or different geographic regions to support different teams with different analytical applications or for different subsets of the data of the source database.

Exactly this can be achieved by embodiments of the technical concept proposed here. The user's application may interact with the target database which in turn may trigger a data manipulation action in the source database, although the target database may typically only be optimized for fast read and/or analytical operations.

Embodiments of the inventive concept may leave the control of whether data is changed and persisted on the target database with the source database. This can help to avoid database internal failures and a blocking of the system.

Additional embodiments of the inventive concept will be described.

According to one useful embodiment of the approach, the sending the data manipulation request to the source database may be performed by the data replication engine of the database management system. The data replication engine may optionally be implemented in hardware, thereby supporting very fast replication processes and not generating any additional load to the database system comprising the source database and target database. In another implementation, the data replication engine may also be implemented in software or using a combination of hardware and software.

According to one possible embodiment of the approach, the source database may be a row-oriented database. Hence, in the form of a row-oriented relational database the source database may be optimized for transactions (e.g., transactional workloads). This may be the characteristic of the primary database supporting an end-user application. Often, customer records or order entries or payment records have to be read or updated. Nowadays, transactional databases may mainly be used for reporting of the ongoing entries and less for heavy-load analytical operations. If the transactional part of a combined or linked database system may be complemented by a target database optimized for OLAP queries, both user communities—in particular, transactional users and analytical users and requirements—may be satisfied best. Under another aspect, the source database may also be implemented as a column-oriented database.

According to other possible embodiments of the method, the target database may be a row-oriented database or a column-oriented database. Typically, the target database may be an OLAP optimized database, i.e., being organized in a column-oriented way. However, also the row-orientation is possible for the target database. Thus, all combinations of row- and/or column-oriented databases are possible as part of the here proposed concept embodiments.

According to an embodiment of the approach, the target database may be an in-memory database. This may allow very fast transactions and/or analytical processes. Additionally, the source database may be implemented as an in-memory database.

According to an embodiment of the approach, the log position—in particular, the position in a logging record file—may be a position of a data manipulation action which was performed to data in the source database. This may be denoted as logical record serial number (LRSN) of the recovery log file.

According to another embodiment of the approach, the target database may be optimized for read-only operations. However, IUD (insert, update, delete) action may also be generally possible here. However, IUD actions in the target database may be more an exception than the rule. This may be due to the fact that target database may be more used for analytical processes and because the target database may exist in several copies—e.g., in different locations/geographies—for a fast read access to the data. In one embodiment, the target database(s) may be implemented using cloud storage technologies.

According to one enhanced embodiment, the approach may also comprise—in particular, after the sending the data manipulation request to be persisted—waiting, by the target database, for the data manipulation action to be accepted or declined by the source database and respectively be notified by the data replication engine. Before such a confirmation exists, the data manipulation action operation is not confirmed or committed in the target database. Hence, the logical control for the consistency of the data in the source database remains with the source database.

According to a further developed embodiment, the approach may also comprise—in case of the unsuccessful attempt to persist the data manipulation action a skipping of the notifying the target database—by the source database, via the data replication engine about the unsuccessful attempt. Instead, the target database may notify the source database about the unsuccessful attempt directly. Implementing the feedback process and the above described approach makes the function faster. In a further step, the target database may inform the data replication engine about the result of the attempt. Hence, additional, not necessary communication via the replication engine can be avoided which may save valuable computing resources.

According to another embodiment of the approach, the data replication engine may be configured to receive requests from both the source database and the target database. Hence, both sides, in particular the source database and the target database, may have an active API (application programming interface) to instruct the replication engine to communicate in a predefined way with the respective other database.

In the following, a detailed description of the figures will be given. All instructions in the figures are schematic. Firstly, a block diagram of an embodiment of the inventive approach for data replication in a database management system comprising a source database and a target database is given. Afterwards, further embodiments, as well as embodiments of the data replication system for data replication in a database management system comprising a source database and a target database will be described.

Figure 1:
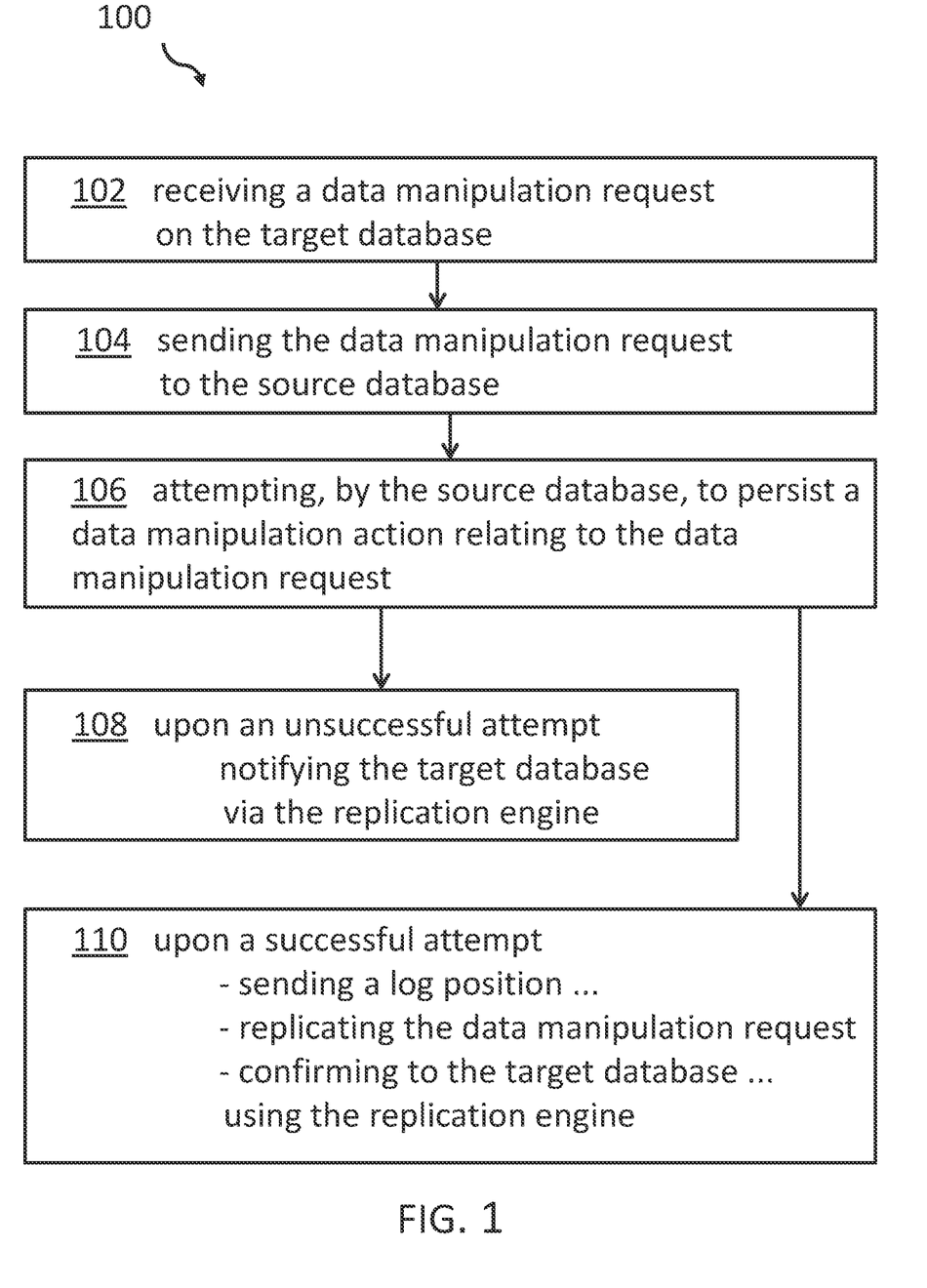
FIG. 1 shows a block diagram of an embodiment of the invention for data replication in a database management system comprising a source database and a target database.

FIG. 1 shows a block diagram of a preferred embodiment of the approach 100 for data replication in a database management system comprising a source database and a target database. The approach 100 comprises receiving, 102, a data manipulation request—e.g., a request for a data insert or update or deletion action using a data manipulation language—on the target database, sending, 104—by a replication engine—the data manipulation request to the source database. During this, the target database may wait for the data manipulation action to be persisted or declined on the source and respectively to be notified via the replication engine.

The approach 100 comprises also attempting, 106—by the source database—to persist a data manipulation action relating to the data manipulation request. Such an attempt may fail due to a database locking situation (e.g., attempting to change of the same data in parallel by multiple processes), system or network latency, etc.

Furthermore, upon an unsuccessful attempt, 108, to persist the data manipulation action—e.g., not being able to store the changed related data in the source database—notifying, by the source database, the target database via the data replication engine about the unsuccessful attempt; and, upon a successful attempt, 110 to persist the data manipulation action, sending, by the source database, a log position—in particular, from a log file, i.e., the source database recovery log—of the data manipulation action related to the data manipulation request to the data replication engine, replicating, by the data replication engine, the data manipulation request triggering the related data manipulation action in the target database, and confirming, by the replication engine using the wait-for-data functionality, to the target database that the data manipulation action in the target database has been completed. The last step of the approach 100 can be helpful because of the waiting of the target database for a confirmation of the source database that data can be changed on the target database.

Figure 2:
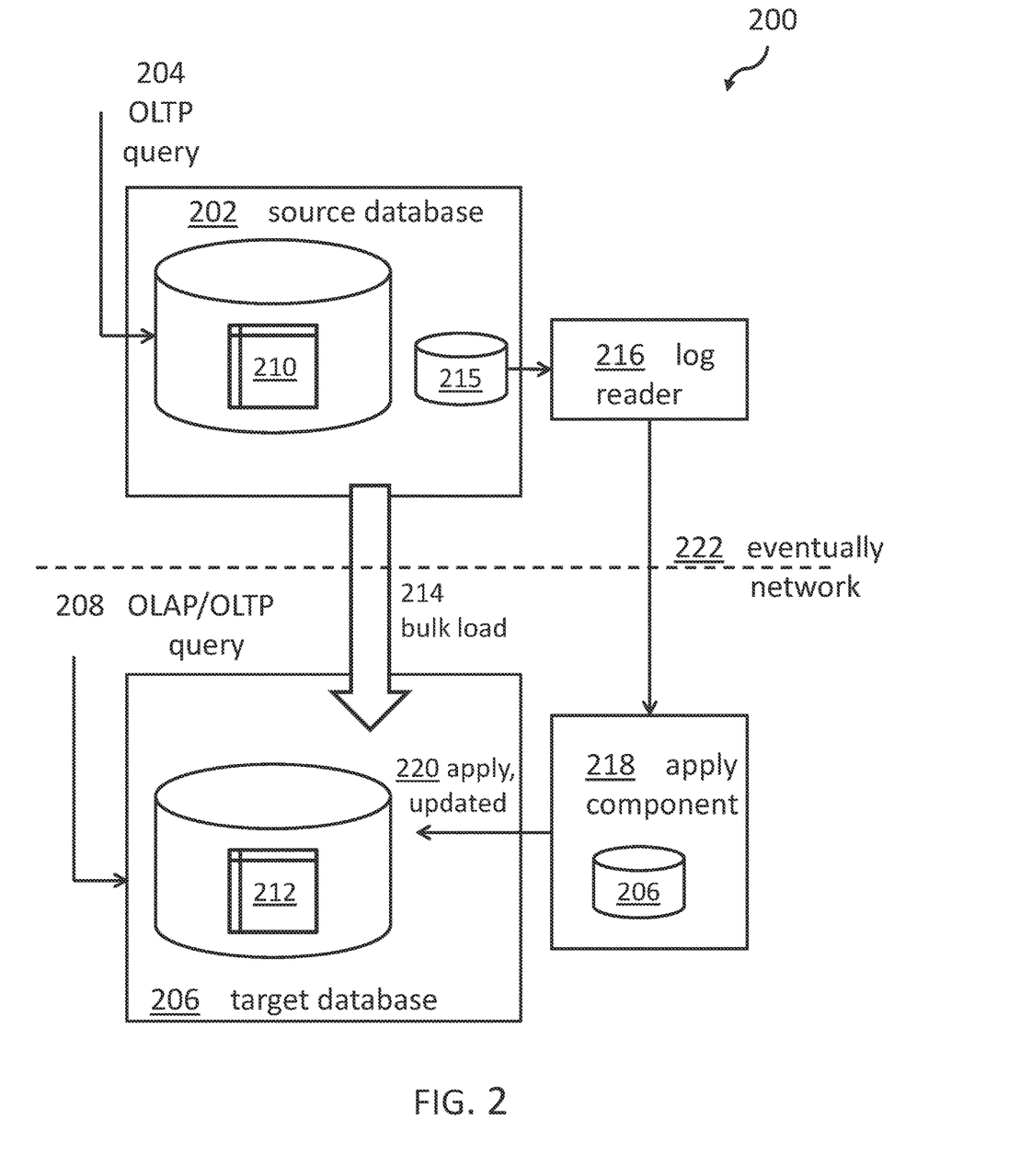
FIG. 2 shows a block diagram of an embodiment of a practical data replication environment.

FIG. 2 shows a block diagram of an embodiment 200 of linked databases. The primary or source database 202 typically receives OLTP queries 204 and the target database 206 typically receives OLAP queries 208 (however, also OLTP queries are possible), either directly or indirectly via the source database or, in general by the database management system. Those queries that are identified as OLAP queries 208 can be transferred or offloaded to the secondary or target database 206 (or alternatively, also OLTP queries). The source database 202 comprises a plurality of tables 210 and related stored data. The target database 206 also comprises tables 212 which represent at least a subset of the database tables 210 of the source database 202 and at least a subset of the data in a specific database table 210.

OLTP queries 204 are typically executed directly in the source database 202 and query results are returned to the requesting program or process. Hence, the OLTP or source database 202 can operate at its best performance because it is not slowed down by any resource intensive OLAP queries.

Because of a potentially different data organization in the target database 206—e.g., column-oriented instead of row-oriented as in the source or OLTP database 202—the target database may return OLAP results much faster than the source database 202.

A replication from the source database 202 to the target database 206 can be achieved by a bulk load process 214 (at least an initial load) and/or via the log file 215, the log reader 216 and the apply component 218 that applies, 220, the required updates to the target database using known technologies.

It shall also be mentioned that the source database 202 and the target database 206 may be operated in a cloud native or also hybrid cloud environment, i.e., reachable via a network 222. E.g., the source database 202 may be operated on-site at a company's premise, while the target database 206 may be operated using remote cloud computing resources. Furthermore, multiple target databases 206 may be operated in different regional geographies allowing decentralized OLAP queries for, e.g. subsidiaries of the company. However, if the target database(s) is/are read only, potentially required updates to the corporate database may be performed under network latency and bandwidth constraints. Therefore, it may be useful not only to read data from the remote, cloud operated target database but also use the target database for updates, i.e., data manipulation actions. A way how this can be achieved elegantly and advantageously is illustrated in the next figure.

Figure 3:
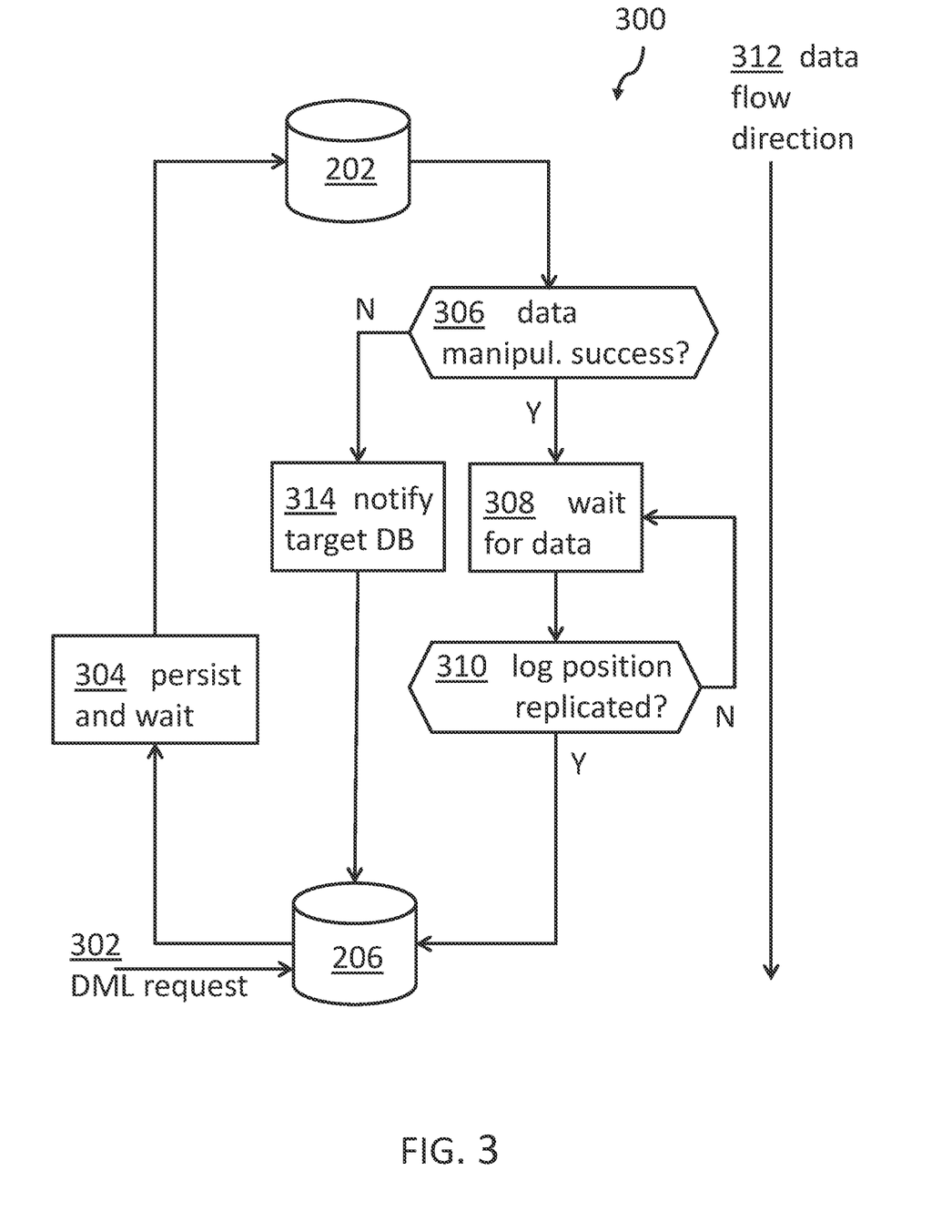
FIG. 3 shows a flow chart of an embodiment of the invention.

FIG. 3 shows a block diagram of an embodiment 300 of process elements of the concept proposed here. The figure shows again the source database 202 as well as the target database 206. Typically, the target database is the target for a data replication as described above. This is again expressed in the general data flow direction 312 from the source database 202 to the target database 206.

However, although the target database 206 is typically a read-optimized or data analytics-optimized database, the target database 206 may also receive a request 302 for a data manipulation, using a data manipulation language (DML). When speaking about a database or a database system here, not only the pure storage environment is meant but also surrounding management processes of the respective database.

Upon receipt of the DML request 302 by the target database/database system, the request can be sent to the source database 202 to attempt to store the modified data permanently, i.e., to persist the changed data, whereby the target databases waits for a confirmation from the source database (compare reference numeral 304). Then, a determination is made whether the data manipulation request and/or the data manipulation action was successful, 306. Hereby, the source database 202 sends the result of the IUD operation (s)—i.e., insert, update or delete—back to the replication engine.

In case the data manipulation action was not successful—case "N"—the source database is notified, 314, typically via the replication engine. As a consequence, the originally requested IUD operation is also not executed in the target database.

If, however, the data manipulation action has been persisted successfully—case "Y"—the procedure waits for the result of the data manipulation action, indicated by "wait for data", 308. For example, the source database sends the log position in the log file of the respective COMMIT operation back to the data replication engine. Consequently, the data replication engine waits until the given log position (e.g., represented as LRSN, (logical record serial number)) is replicated, 310, to the target database using known technologies.

Once the desired log position has been replicated—case "Y" of determination 310—the data replication engine notifies the database 206 of the success of the operation in the source database 202. With this, the process ends.

However, in order to achieve these results, additional requirements may be made to the target database: it is instrumental to have an extended SQL syntax for persisting changes on the source database. This is useful on the target database in order to define that an insert, update or delete (UID) operation has to be executed consistently with the source database system. A possible implementation would be to use the syntax:
INSERT INTO S1.T1 ("something") PERSIST ON SOURCE;

Another solution would be to define initially that records should be persisted on the source and then execute regular IUD statements:

PERSIST ON SOURCE;
INSERT INTO S1.T1 ("something");
DELETE FROM S2.T2 WHERE ("something");

Last but not least, one could also introduce a new table type on the target database that specifies that the table is a replicated table from a remote source database. Then, every regular IUD statement could be automatically replicated back to the source database. For example:
CREATE TABLE S1.T1 AS REPLICATED TABLE FOR (SOURCE DEFINITION).

Furthermore, for the communication with the replication engine is instrumental: The target database should be able to communicate with the replication engine when an UID with a "PERSIST ON SOURCE/AS REPLICATED TABLE FOR" request is submitted. The target database should be able to initiate the communication and get notified for the result of the request. This could be successful so that the data has been persisted on the source database and replicated to the target database or unsuccessful if the source database could not persist the given data changes.

There may also be additional requirements for the replication engine: Firstly, there should be a possibility to forward an IUD data manipulation request to the source database for persisting. And secondly, there should be a possibility to wait until a given log position is replicated to the target database system. This can be implemented using known technology. Once this data is replicated or the given operation was rejected by the source database, the target database should be notified accordingly.

Figure 4:
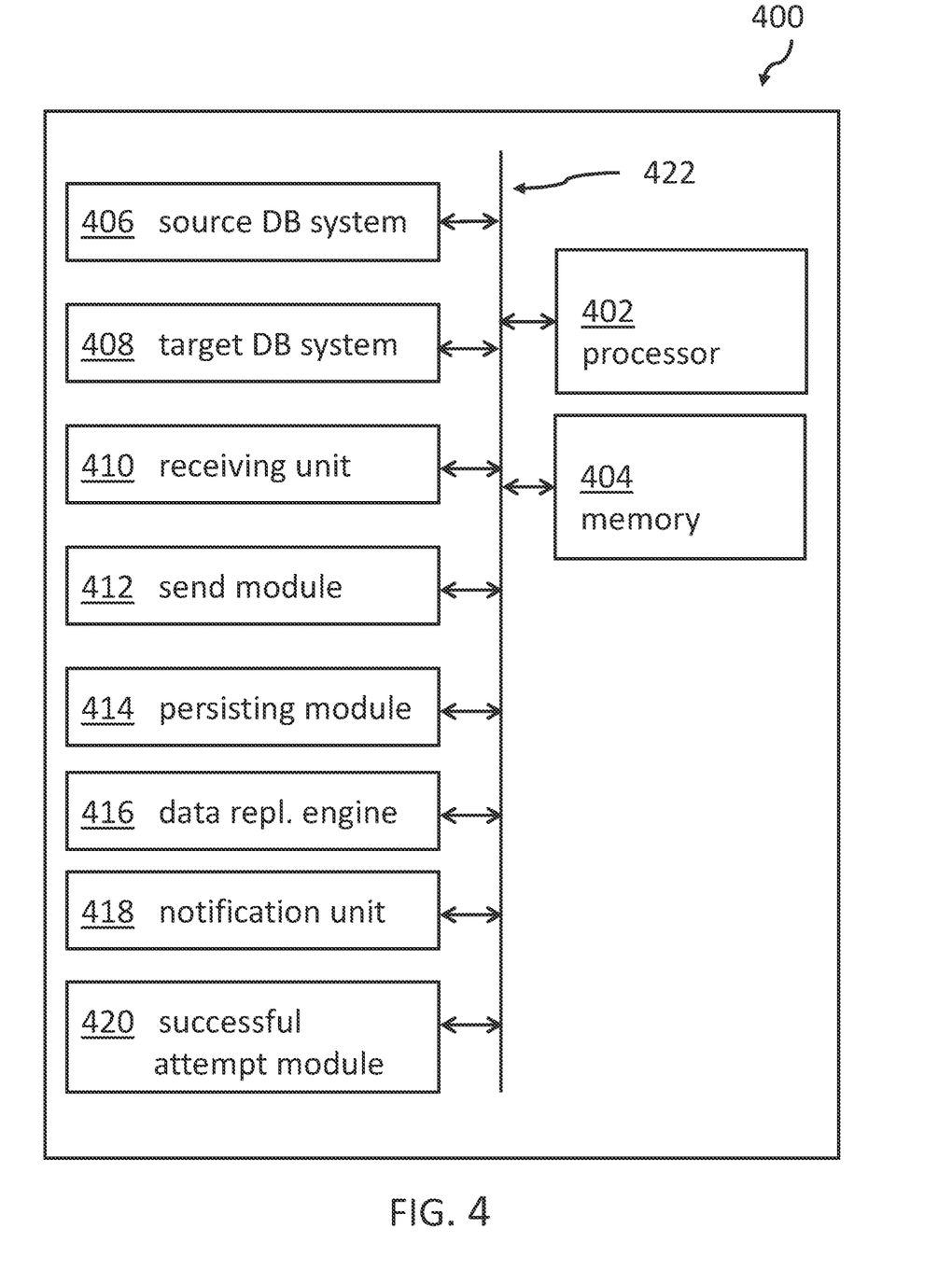
FIG. 4 shows a block diagram of an embodiment of the invention data replication system for data replication in a database management system comprising a source database and a target database.

FIG. 4 shows a block diagram of an embodiment of the proposed data replication system 400 for data replication in a database management system comprising a source database system 406 and a target database system 408. The data replication system 400 comprises also a processor 402 and a memory 404, communicatively coupled to the processor 402, wherein the memory 404 stores program code portions that when executed, enable the processor 402, to receive a data manipulation request for the target database system 408—using a receiving unit 410—to send, either by a send module 412 or by the replication engine 416—the data manipulation request to the source database system 406, and attempt—by the source database system 406—to persist a data manipulation action relating to the data manipulation request.

The processor 402 is also enabled upon an unsuccessful attempt to persist the data manipulation action to notify—by the source database 406 and/or the notification unit 418 also using the data replication engine 416—the target database about the unsuccessful attempt. On the other side, the processor 402 is also enabled upon a successful attempt to persist the data manipulation action—e.g., by using the successful attempt module 420—to send, by the source database system 406, a log position of the data manipulation action related to the data manipulation request to a data replication engine, to replicate by the data replication engine, the data manipulation request triggering the related data manipulation action in the target database, and to confirm, by the replication engine, to the target database that the data manipulation action in the target database has been completed.

It may also be noted that the source database 206 and the source database system may be related to each other. The same applies to the target database 206 and the target database system 408.

It is shall also be mentioned that all functional units, modules and functional blocks—in particular, source database system 406, the target DB system 408, the receiving unit 410, the send module 412, the persisting module 414, the data replication engine 416, the notification unit 418 and, the successful attempt module—may be communicatively coupled to each other for signal or message exchange in a selected 1:1 manner. Alternatively the functional units, modules and functional blocks can be linked to a system internal bus system 422 for a selective signal or message exchange.

Figure 5:
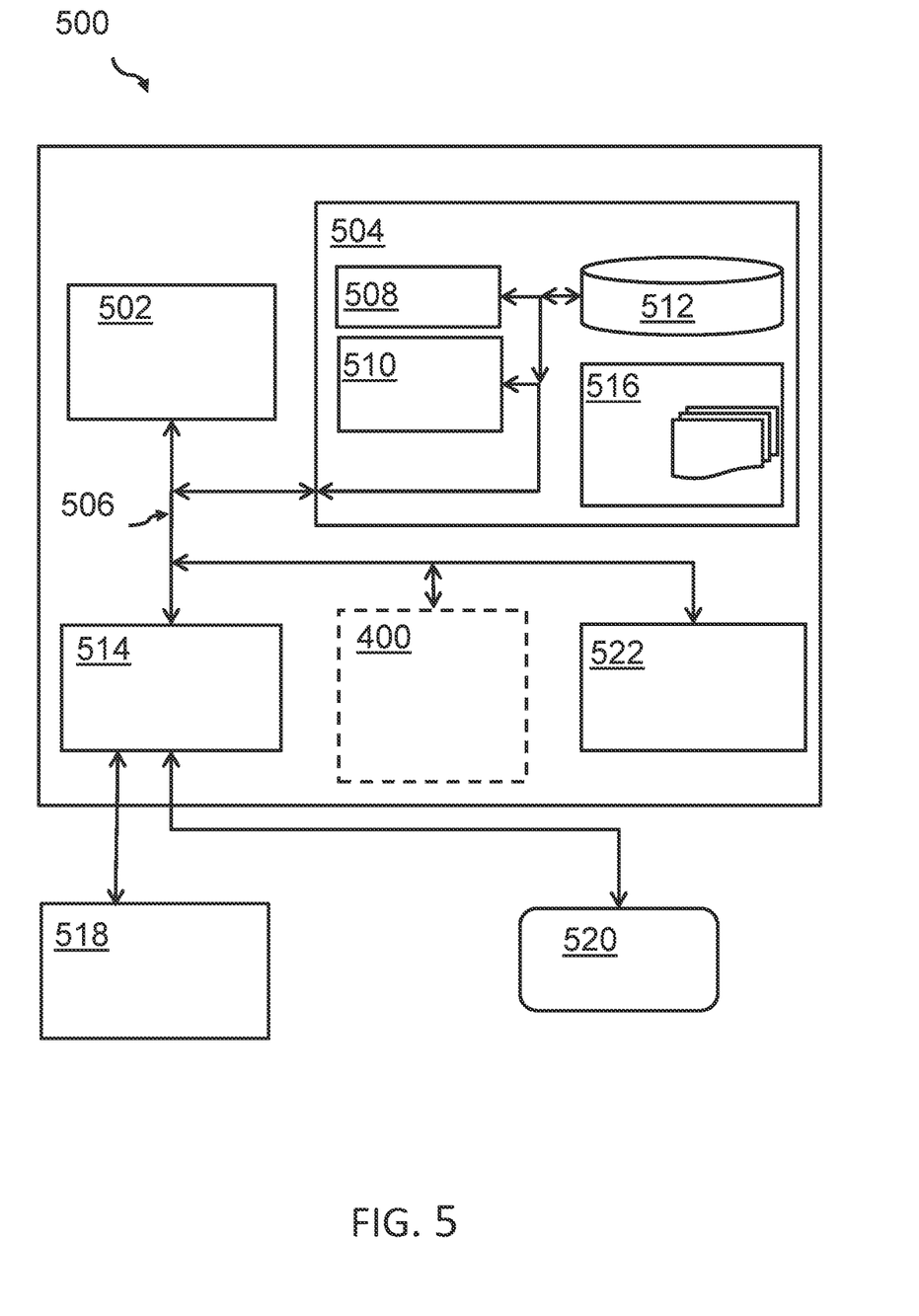
FIG. 5 depicts a cloud computing node according to an embodiment of the present invention.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the data replication system 400 (see FIG. 4) for data replication in a database management system comprising a source database system 406 and a target database system 408 may be attached to the bus system 506.

Figure 6:
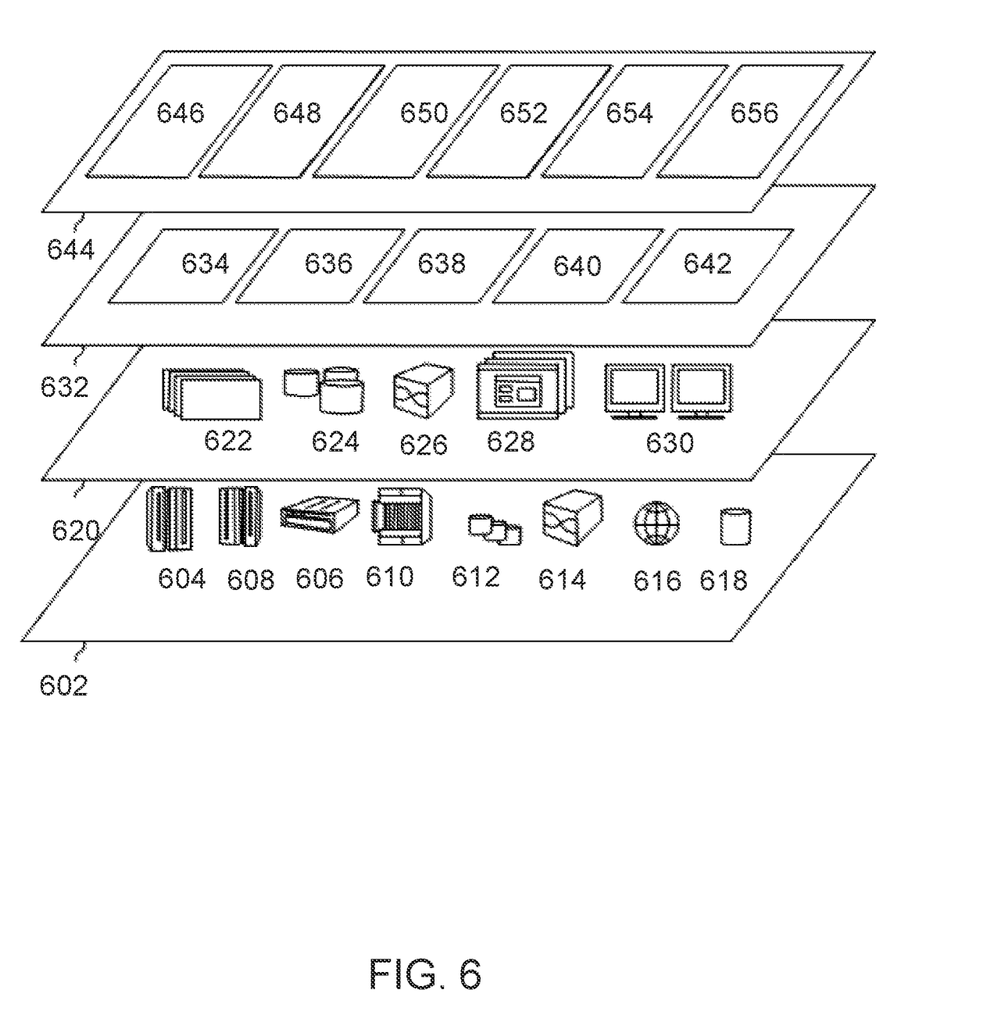
FIG. 6 depicts abstraction model layers according to an embodiment of the present invention.

Referring now to FIG. 6, a set of functional abstraction layers provided by cloud computing environment 702 (FIG. 7) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 602 includes hardware and software components. Examples of hardware components include: mainframes 604; RISC (Reduced Instruction Set Computer) architecture based servers 608; servers 606; blade servers 610; storage devices 612; and networks and networking components 614. In some embodiments, software components include network application server software 616 and database software 618.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 632 may provide the functions described below. Resource provisioning 634 provides dynamic procurement of computing resources and other resources that are utilized to perform tasks within the cloud computing environment. Metering and Pricing 636 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 638 provides access to the cloud computing environment for consumers and system administrators. Service level management 640 provides cloud computing resource allocation and management such that required service levels are met. Service Level Agreement (SLA) planning and fulfillment 642 provide pre-arrangement for, and procurement of, cloud computing resources for which a future requirement is anticipated in accordance with an SLA.

Workloads layer 644 provides examples of functionality for which the cloud computing environment may be utilized. Examples of workloads and functions which may be provided from this layer include: mapping and navigation 646; software development and lifecycle management 648; virtual classroom education delivery 650; data analytics processing 652; transaction processing 654; and the data replication system 656 for data replication in a database management system comprising a source database and a target database (compare also FIG. 4, 400).

Figure 7:
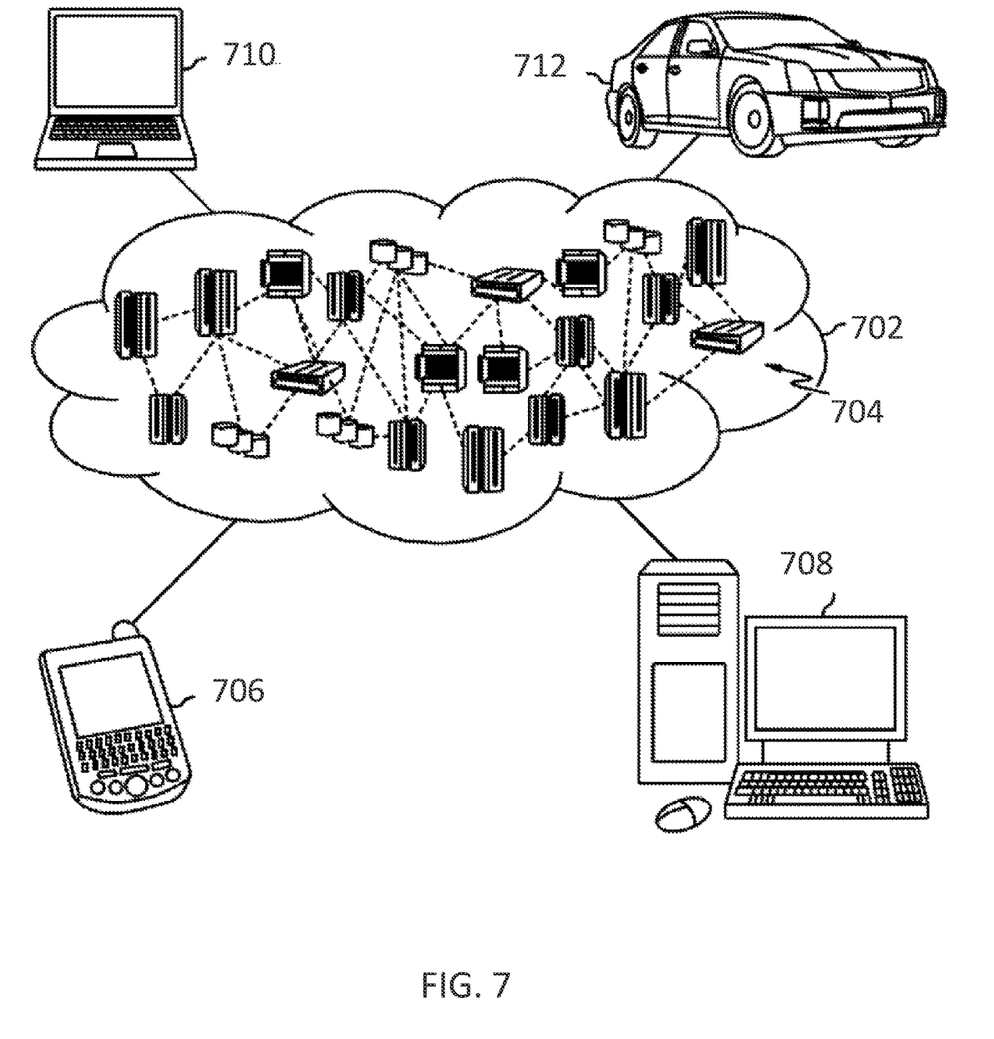
FIG. 7 depicts a cloud computing environment according to an embodiment of the present invention.

Referring now to FIG. 7, illustrative cloud computing environment 702 is depicted. As shown, cloud computing environment 702 includes one or more cloud computing nodes 704 with which local computing devices used by cloud consumers, such as, for example, personal digital assistant (PDA) or cellular telephone 706, desktop computer 708, laptop computer 710, and/or automobile computer system 712 may communicate. Nodes 704 may communicate with one another. They may be grouped (not shown) physically or virtually, in one or more networks, such as Private, Community, Public, or Hybrid clouds as described hereinabove, or a combination thereof. This allows cloud computing environment 702 to offer infrastructure, platforms and/or software as services for which a cloud consumer does not need to maintain resources on a local computing device. It is understood that the types of computing devices (706, 708, 710, 712) shown in FIG. 7 are intended to be illustrative only and that computing nodes 704 and cloud computing environment 702 can communicate with any type of computerized device over any type of network and/or network addressable connection (e.g., using a web browser).

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving, by one or more processors, a data manipulation request on a target database;
    causing, by one or more processors, a data replication engine to send the data manipulation request to a source database;
    prior to triggering a data manipulation action, relating to the data manipulation request, in the target database, causing, by one or more processors, the source database to attempt to persist the data manipulation action relating to the data manipulation request; and
    responsive to a successful attempt to persist the data manipulation action by the source database:
        causing the source database to send a log position of the data manipulation action to the data replication engine, wherein the log position is a sequence number of results of already performed transactions and each position of the log record stores a respective data manipulation request;
        replicating, by one or more processors, the data manipulation request triggering the data manipulation action in the target database; and
        confirming, by one or more processors, to the target database that the data manipulation action in the target database has been completed.

2. The computer-implemented method of claim 1, wherein the source database is a row-oriented database.

3. The computer-implemented method of claim 1, wherein the target database is a row-oriented database.

4. The computer-implemented method of claim 1, wherein the target database comprises an in-memory portion for fast execution of complex and multi-dimensional queries database and a persistent portion which stores tables and data of the in-memory portion of the target database to a selection from the group consisting of a hard drive and flash memory.

5. The computer-implemented method of claim 1, wherein the target database is optimized for read-only operation.

6. The computer-implemented method of claim 1, further comprising:
responsive to an unsuccessful attempt to persist the data manipulation action:
causing the source database to skip notifying the target database via the data replication engine about the unsuccessful attempt; and
directly notifying the target database about the unsuccessful attempt.

7. The computer-implemented method of claim 1, wherein the data replication engine received requests from both the source database and the target database.

8. A computer program product comprising:
one or more computer readable storage media, and program instructions collectively stored on the one or more computer readable storage media, the program instructions comprising:
program instructions to receive a data manipulation request on a target database;
program instructions to cause a data replication engine to send the data manipulation request to a source database;
program instructions to, prior to triggering a data manipulation action, relating to the data manipulation request, in the target database, cause the source database to attempt to persist the data manipulation action relating to the data manipulation request; and
program instructions to, responsive to a successful attempt to persist the data manipulation action by the source database:
cause the source database to send a log position of the data manipulation action to the data replication engine, wherein the log position is a sequence number of results of already performed transactions and each position of the log record stores a respective data manipulation request;
replicate the data manipulation request triggering the data manipulation action in the target database; and
confirm, by one or more processors, to the target database that the data manipulation action in the target database has been completed.

9. The computer program product of claim 8, wherein the source database is a row-oriented database.

10. The computer program product of claim 8, wherein the target database is a row-oriented database.

11. The computer program product of claim 8, wherein the target database comprises an in-memory portion for fast execution of complex and multi-dimensional queries database and a persistent portion which stores tables and data of the in-memory portion of the target database to a selection from the group consisting of a hard drive and flash memory.

12. The computer program product of claim 8, wherein the target database is optimized for read-only operation.

13. The computer program product of claim 8, further comprising:
program instructions, collectively stored on the one or more computer readable storage media, to, responsive to an unsuccessful attempt to persist the data manipulation action:
cause the source database to skip notifying the target database via the data replication engine about the unsuccessful attempt; and
directly notify the target database about the unsuccessful attempt.

14. The computer program product of claim 8, wherein the data replication engine received requests from both the source database and the target database.

15. A computer system comprising:
one or more computer processors, one or more computer readable storage media, and program instructions collectively stored on the one or more computer readable storage media for execution by at least one of the one or more computer processors, the program instructions comprising:
program instructions to receive a data manipulation request on a target database;
program instructions to cause a data replication engine to send the data manipulation request to a source database;
program instructions to, prior to triggering a data manipulation action, relating to the data manipulation request, in the target database, cause the source database to attempt to persist the data manipulation action relating to the data manipulation request; and
program instructions to, responsive to a successful attempt to persist the data manipulation action by the source database:
cause the source database to send a log position of the data manipulation action to the data replication engine, wherein the log position is a sequence number of results of already performed transactions and each position of the log record stores a respective data manipulation request;
replicate the data manipulation request triggering the data manipulation action in the target database; and
confirm, by one or more processors, to the target database that the data manipulation action in the target database has been completed.

16. The computer-implemented method of claim 1, wherein the log position is a logical record serial number of a recovery log file.

17. The computer-implemented method of claim 1, wherein the target database is a read-optimized database.

* * * * *